US009719595B2

United States Patent
Bur et al.

(10) Patent No.: US 9,719,595 B2
(45) Date of Patent: Aug. 1, 2017

(54) ACTIVE REV-MATCHING FOR MANUAL TRANSMISSIONS

(71) Applicant: GM Global Technology Operations LLC, Detroit, MI (US)

(72) Inventors: Bradford W. Bur, Clarkston, MI (US); Edward J. Rodenbo, Holly, MI (US); Shaun D. Hoffman, West Bloomfield, MI (US); Richard I. Chang, Ann Arbor, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 142 days.

(21) Appl. No.: 14/753,973

(22) Filed: Jun. 29, 2015

(65) Prior Publication Data

US 2016/0377176 A1 Dec. 29, 2016

(51) Int. Cl.
*F16H 63/50* (2006.01)
*F16H 59/02* (2006.01)
*B60W 10/06* (2006.01)
*F16H 59/04* (2006.01)

(52) U.S. Cl.
CPC ......... *F16H 63/50* (2013.01); *F16H 59/0217* (2013.01); *B60W 10/06* (2013.01); *F16H 59/044* (2013.01); *F16H 63/502* (2013.01); *F16H 2063/506* (2013.01); *Y10T 477/675* (2015.01); *Y10T 477/68* (2015.01); *Y10T 477/6808* (2015.01)

(58) Field of Classification Search
CPC ...... F16H 63/502; F16H 63/50; F16H 59/044; Y10T 477/675; Y10T 477/68; Y10T 477/6808; B60W 10/06
See application file for complete search history.

(56) References Cited

U.S. PATENT DOCUMENTS

| | | | |
|---|---|---|---|
| 4,371,051 A | 2/1983 | Achterholt | |
| 4,488,455 A | 12/1984 | Shelter | |
| 6,095,002 A * | 8/2000 | Tuson | B60W 10/06 477/118 |
| 6,367,344 B1 | 4/2002 | Vogt et al. | |
| 6,382,045 B1 | 5/2002 | Wheeler | |
| 7,449,878 B2 | 11/2008 | Lee | |
| 8,004,275 B2 | 8/2011 | Wang et al. | |
| 8,290,666 B2 | 10/2012 | Turski et al. | |
| 8,296,038 B2 | 10/2012 | Verdejo et al. | |
| 8,403,812 B2 | 3/2013 | Turski et al. | |
| 8,434,381 B2 | 5/2013 | Olausson | |
| 8,478,494 B2 * | 7/2013 | Ellis, III | B60W 10/06 477/70 |
| 8,635,003 B2 | 1/2014 | Bauerle et al. | |

(Continued)

FOREIGN PATENT DOCUMENTS

JP  EP 2138741 A2 * 12/2009  ......... F16H 61/0403

*Primary Examiner* — Roger Pang (57) ABSTRACT

An active rev-matching system for a motor vehicle manual transmission includes an engine control module that monitors and adjusts an output speed of the motor vehicle's prime mover and at least one sensor that monitors movement of a shift linkage. When the at least one sensor determines the movement of the shift linkage is an in-gate downshift, the engine control module adjusts the available time for the engine control module to match the output speed of the prime mover to an input speed of the transmission.

20 Claims, 5 Drawing Sheets

(56) References Cited

U.S. PATENT DOCUMENTS

| | | |
|---|---|---|
| 8,686,717 B2 | 4/2014 | Wang |
| 8,731,790 B2 | 5/2014 | Jess et al. |
| 8,739,647 B2 | 6/2014 | Benson et al. |
| 8,746,104 B2 | 6/2014 | Benson et al. |
| 8,874,337 B2 | 10/2014 | Cousins et al. |
| 2004/0104719 A1 | 6/2004 | Johnson |
| 2008/0074104 A1 | 3/2008 | Sauer |
| 2008/0078604 A1 | 4/2008 | Ersoy |
| 2009/0326771 A1* | 12/2009 | Murayama .......... F16H 61/0403 701/54 |
| 2012/0152049 A1* | 6/2012 | Benson ................ F16H 59/044 74/473.3 |
| 2016/0033039 A1* | 2/2016 | Yamasaki ............... F16H 59/70 477/107 |

\* cited by examiner

ACTIVE REV-MATCHING FOR MANUAL TRANSMISSIONS

FIELD

The present disclosure relates active rev matching for manual transmissions.

BACKGROUND

The statements in this section merely provide background information related to the present disclosure and may or may not constitute prior art.

The trend of automatic motor vehicle transmissions for passenger cars, sport utility vehicles, pickup trucks and other consumer vehicles from substantially full hydraulic operation to operation under the control of an electronic transmission control module (TCM) and hydraulic actuators has been accompanied by both the desire and necessity of providing electronic linear position sensors which provide real time data to the transmission control module regarding the current positions of the actuators, the associated shift linkages and the clutches, brakes and gears acted upon. Such data is utilized by the transmission control module to confirm, for example, the commencement and completion of a shift and thus the overall state of the transmission. Such data is also useful for self-diagnosis of impending or actual component failure.

This trend has not been taken up by the other significant class of motor vehicle transmissions, namely, manual transmissions. As the name suggests, such transmissions are manually shifted by the vehicle operator. Since shift timing and gear selection are left to the vehicle operator, the incorporation of various sensors in a manual transmission has been viewed as not only unnecessary but as an invasion of the operator's freedom.

Nonetheless, it is apparent that data regarding the current operating state of a manual transmission can be utilized by associated electronic controllers to improve the overall driving experience. The present invention is so directed.

SUMMARY

In one aspect, an active rev-matching (ARM) system for a motor vehicle manual transmission includes an engine control module that monitors and adjusts an output speed of the motor vehicle's prime mover and at least one sensor that monitors movement of a shift linkage. When the at least one sensor determines the movement of the shift linkage is an in-gate downshift, the engine control module adjusts the available time for the engine control module to match the output speed of the prime mover to an input speed of the transmission.

In another aspect, a method of controlling an active rev-matching (ARM) system for a motor vehicle manual transmission includes one or more of the following steps: monitoring and adjusting an output speed of the motor vehicle's prime mover, monitoring movement of a shift linkage, and adjusting the available time to match the output speed of the prime mover to an input speed of transmission when the movement of the shift linkage is an in-gate downshift.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
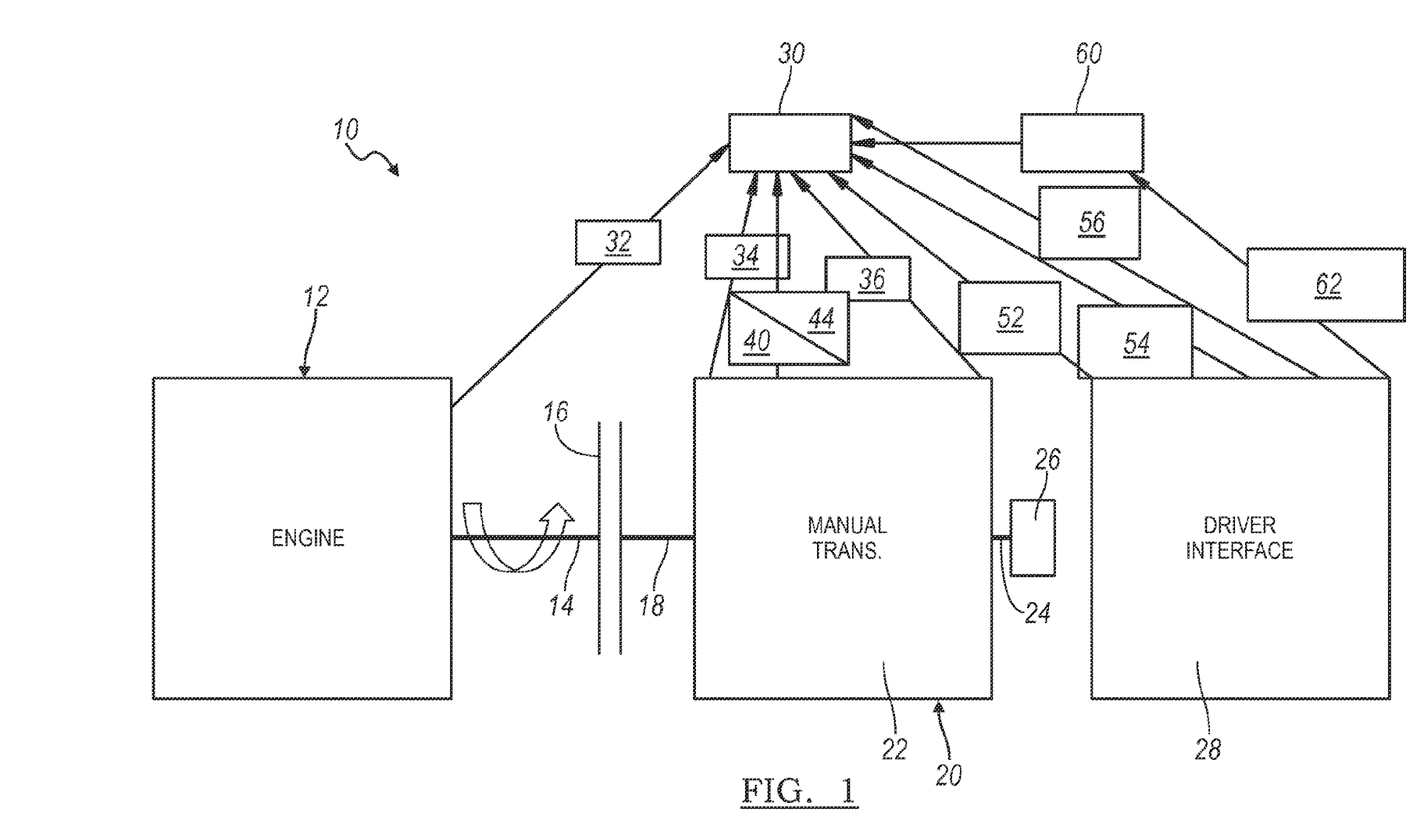
FIG. 1 is block diagram of the relevant electrical, electronic and mechanical components of a motor vehicle having a manual transmission in accordance with the principles of the present invention.

With reference to FIG. 1, a system of relevant electrical, electronic and mechanical components of a motor vehicle having a manual transmission equipped with the present invention are illustrated and generally designated by the reference number 10. The system 10 includes a prime mover 12 which may be a gasoline, Diesel or flex fuel engine, or a hybrid or electric power plant. The prime mover 12 includes an output shaft 14 which drives a main friction clutch 16 which is typically, though not necessarily, engaged and disengaged by the vehicle operator. The main clutch 16 selectively provides drive torque to an input shaft 18 of a manual transmission 20. The manual transmission 20 may be conventional and includes a housing 22 as well as shafts, gears and synchronizer clutches which cooperatively provide, for example, four, five, six or more forward speeds or gear ratios and reverse. The transmission includes an output shaft 24 which is coupled to a final drive assembly 26 which may include, for example, a propshaft, a differential assembly and a pair of drive axles. A driver interface 28 generally includes those controls and devices under the control of and operated by the vehicle operator.

The system 10 also includes a plurality of electric and electronic sensors which provide real time data to an engine control module (ECM) 30. For example, an electronic sensor (tachometer) 32 disposed in the prime mover 12 provides a signal representing the current speed of the output shaft 14 of the prime mover 12. A transmission input speed sensor (TISS) 34 senses the instantaneous speed of the input shaft 18 of the manual transmission 20. A transmission output speed sensor (TOSS) 36 senses the instantaneous speed of the output shaft 24 of the manual transmission 20. A gear absolute shift position sensor assembly 40 according to the present invention includes an application specific integrated circuit 44, the data output of which indicates the current position of a shift lever 72. A clutch position sensor 52 senses the position a clutch pedal and, hence, the position of the main clutch 16. A rate of change of the clutch pedal position sensor is calculated by the ECM 30 based on the change of the position of the clutch pedal over time. A throttle position sensor 54 senses the instantaneous position of a throttle pedal. A brake pedal position sensor 56 sense the position of a brake pedal. A body control module (BCM) 60 receives data from one or more control switches 62 and includes a data output to the engine control module 30. As described below, an active rev-matching (ARM) system includes various components of the system 10. The ARM system matches the speed of the primer mover output and input speed of the transmission. Note that not all of the components described above are required for the operation of the ARM system. For example, in some arrangements the TISS 34 is not employed.

Figure 2:
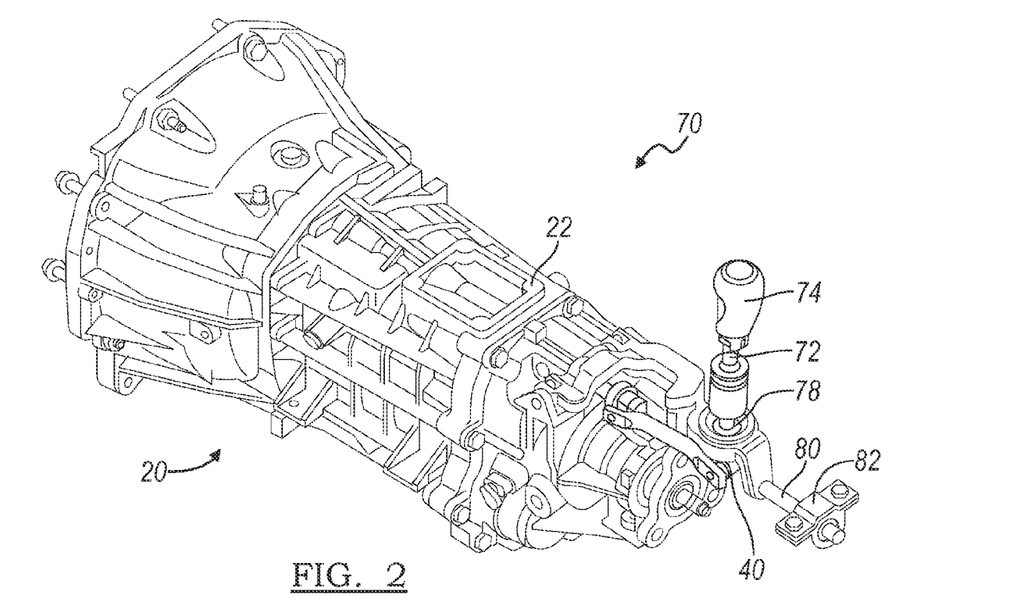
FIG. 2 is a perspective view of a portion of a manual transmission including a shift linkage in accordance with the principles of the present invention.
Figure 3A:
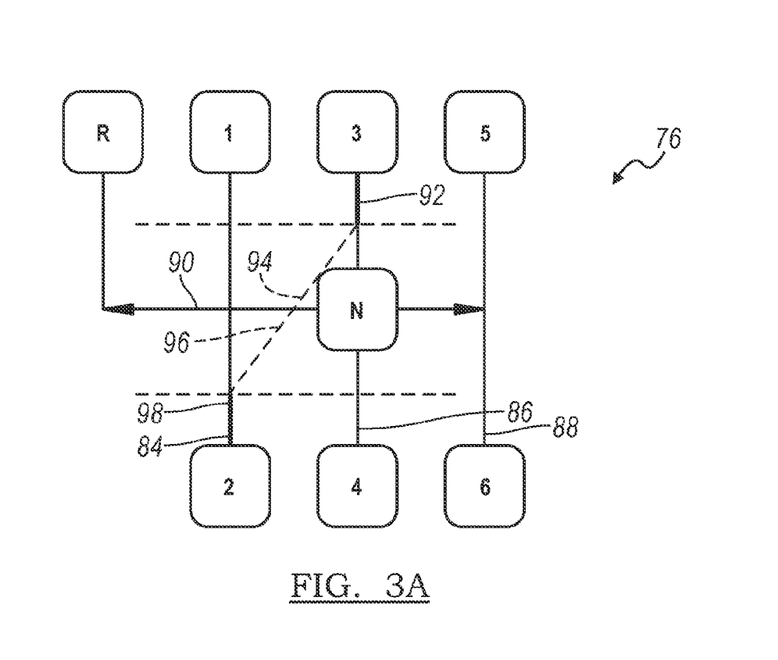
FIG. 3A is a plan view of a six speed manual transmission shift gate ("H") pattern.

Referring now to FIGS. 2 and 3A, a shift linkage 70 attached to the exterior of the housing 22 of the manual transmission 20 is shown. The shift linkage 70 includes a shift lever 72 which terminates in a shift ball or handle 74 that is engaged and manipulated by the vehicle operator. The shift lever 72 is moveable through a virtual or actual shift gate or "H" pattern 76, illustrated in FIG. 3A, which facilitates selection of, separates and creates tactile feedback for six forward gears or speed ratios and reverse. It should be understood, however, that the manual transmission 20 with which the present invention is utilized may incorporate and provide more or fewer gears or speed ratios. The shift lever 72 is disposed in a ball pivot 78 and coupled to a longitudinally oriented shaft 80 which is supported by various mounting members or brackets and bearings 82 which allow it to translate fore and aft and rotate about its axis.

A typical cross-gate down shift for a manual transmission includes, for example, third gear to second gear (regions 92, 94, 96 and 98), in which the ARM system assumes an upshift in the regions 92 and 94 and then assumes a downshift in the regions 96 and 98. Accordingly, the ARM system targets the second gear as soon as the shift lever passes from the third gear to fourth gear gate (regions 92 and 94 before neutral 90) to the first gear to second gear gate (regions 96 and 98 after neutral 90). In the cross-gate shift, therefore, the ARM system has time to rev up the prime mover before the shifter moves into the second gear position and the driver releases the clutch pedal, particularly because of the higher remaining shift travel as well as the transmission synchronization time.

Figure 3B:
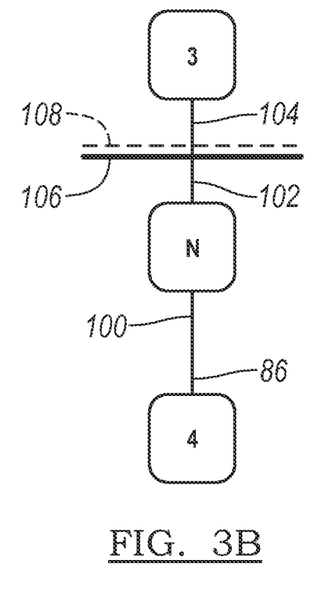
FIG. 3B is a plan view of a manual transmission in-gate downshift.

In contrast, an in-gate downshift generally includes one of: second gear to first gear 84, fourth gear to third gear 86, and sixth gear to fifth gear 88. For example, in a conventional manual transmission downshift (FIG. 3B), the operation of the transmission assumes an upshift (regions 100 and 102) before assuming a downshift (region 104) occurs. Specifically, the region 104 occurs after a shift position 108, which is after the synchronizers engage 106. Hence, in such a transmission, the matching of the prime mover output speed to the transmission input speed targets the third gear in the region 104. Accordingly, there is not much time for the system to rev up the prime mover before the shifter is physically in gear and the driver releases the clutch pedal.

Figure 3C:
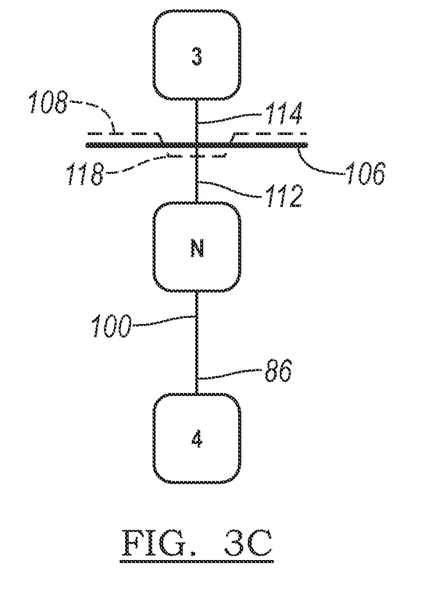
FIG. 3C is a plan view of a manual transmission in-gate downshift in accordance with the principles of the present invention.

In accordance with the principles of the present invention, however, the system 10 adjusts the time for the ARM system to match the output speed of the prime mover to the input speed of the transmission during an in-gate downshift 86, as shown in FIG. 3C. That is, if an in-gate downshift is sensed by the sensor assembly 40, the ECM 30 adjust a rev-match start time relative to the position of the shift linkage 70. More specifically, the transmission 20 assumes an upshift in the regions 100 and 112 and then assumes a downshift in a region 114. The downshift region 114 occurs after a shift position 118, which is before the synchronizers engage 106. Thus, the system 10 commands a downshift rev match earlier in the shift process before the driver has moved the shift lever to where the synchronizers engage for the target gear. Hence, the system 10 allows the prime mover speed increase to occur simultaneously with the transmission gear synchronization. A particular feature of the system 10, is its ability to adjust the rev time based on the lateral position of the shift lever within the gate (that is, along shift position 118).

It should be appreciated that the gear absolute position sensor assembly 40 of the present invention provides and enables several benefits and features. For example, it supports engine start-stop applications inasmuch as they require neutral position detection. The invention improves shift quality and reduces driveline clunk by facilitating the pre-synchronization of the driveline. Additionally, matching of the speed of the engine output and transmission input, and in particular ARM, which requires absolute gear position and the anticipated gear, is possible. Torque management which may reduce transmission mass and complexity is also possible. Remote, that is, unattended, starting is also facilitated since it, too, requires neutral position detection. Furthermore, the invention may be utilized to reduce or substantially eliminate abuse of the transmission as it may be utilized to sense and prevent a potentially abusive operational event. Finally, the invention provides full diagnostic capability, for example, short to power, short to ground and open circuit.

The gear absolute position sensor assembly 40 includes one or more magnetic sensors along with one or more magnets (such as, ring or arc magnets), respectively. For example, the gear absolute position sensor assembly 40 can include one or more Hall effect sensors along with one or more magnets. The outputs of the one or more sensors are fed directly to the application specific integrated circuit 44 which may be formed and assembled integrally with the sensors into a unitary device. Alternatively, a single arc magnet or ring and a proximate single three dimensional (3D) Hall effect sensor may be utilized.

It will be appreciated that the magnets and the associated Hall effect sensors may be mounted within the transmission housing 22, through the transmission housing 22 or at any convenient location where the rings may be attached to the shaft 80 and the sensors mounted proximately. For example, they may be mounted within or near the bracket or bearing 82 illustrated in FIG. 2. As an alternative to Hall effect sensors, anisotropic magneto resistance (AMR), giant magneto resistance (GMR), permanent magnet linear contactless displacement (PLOD), linear variable displacement transformer (LVDT), magneto elastic (ME) or magneto inductive (MI) sensors may be utilized.

Further details of the operation of gear absolute position sensors are described in U.S. Pat. No. 8,739,647, the entire contents of which are incorporated herein by reference.

It will be appreciated that not only each gear selection position has a unique numerical value or signature but also that as the shift lever 72 is moved and the shaft 80 is translated and rotated, the outputs of the sensor assembly 40 and the application specific integrated circuit 44 provide a continuously varying, essentially analog, signal that permits the engine control module 30 or other, similar device to infer not only the present location of the shift lever 72 and the shaft 80 but also their direction of motion and the speed of such motion.

Figure 4:
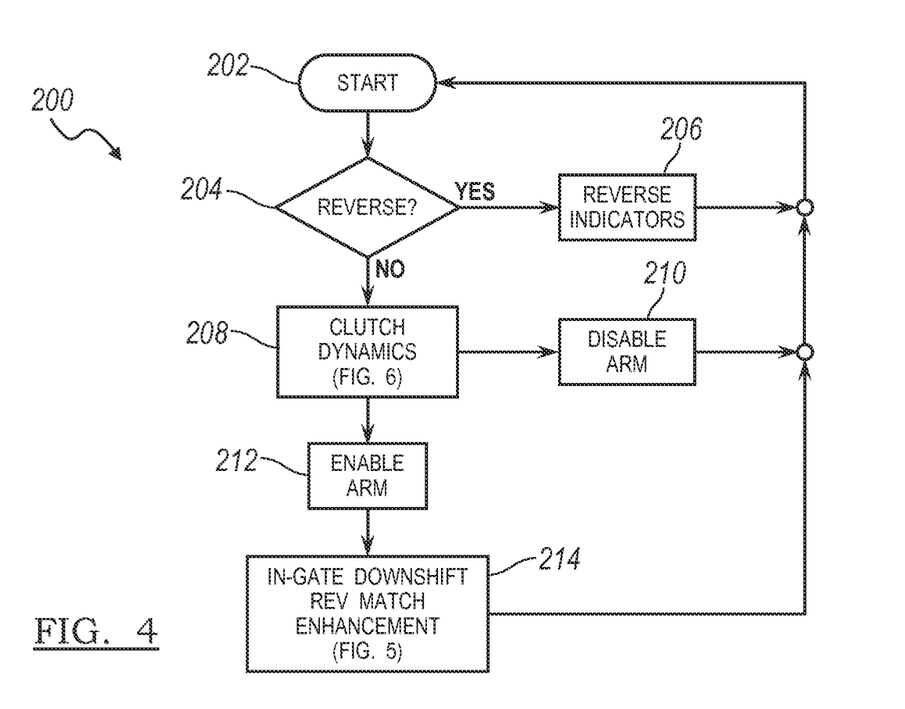
FIG. 4 is a flow diagram of a process to operate active rev matching with the transmission described in FIG. 1 in accordance with the principles of the present invention.
Figure 5:
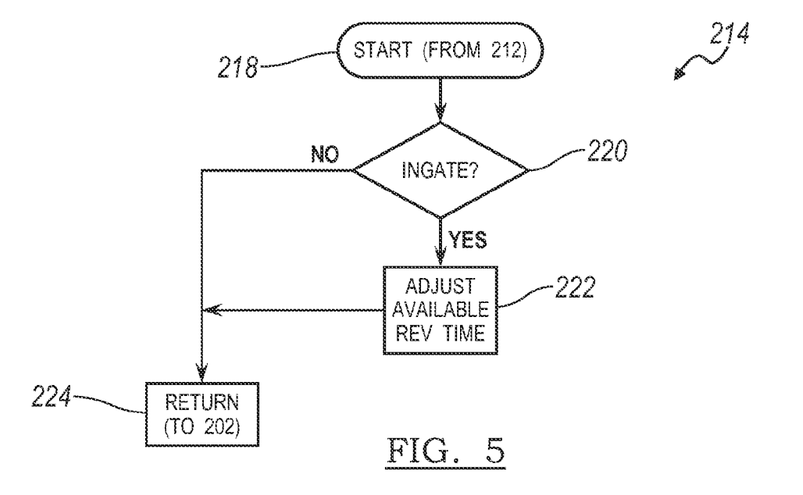
FIG. 5 is a flow diagram of a sub-process of the process shown in FIG. 4 to adjust the available rev time for in in-gate downshift.
Figure 6:
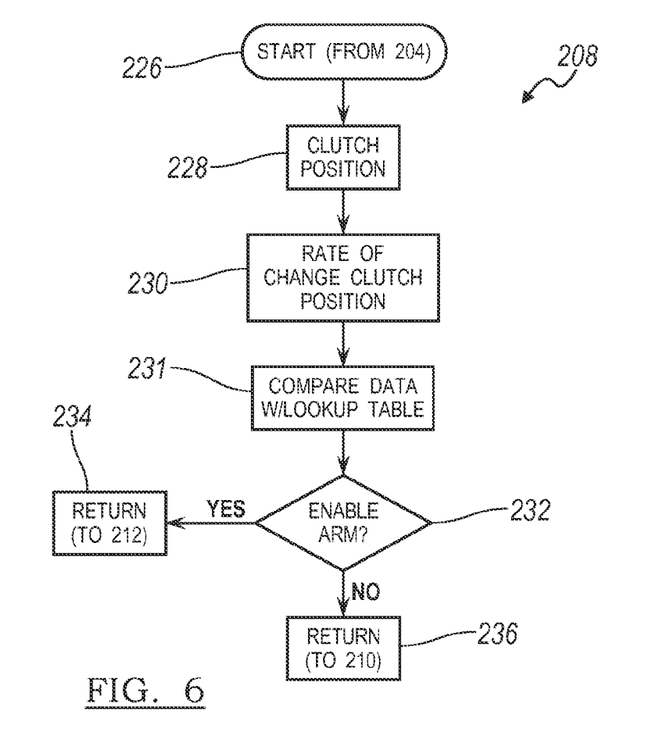
FIG. 6 is a flow diagram of a sub-process of the process shown in FIG. 4 to characterize clutch dynamics.

Referring now to FIGS. 4, 5 and 6, the operation of the system 10, in particular, the ARM system, is discussed in further detail. FIG. 4 shows a process 200 that begins with a step 202. The process 200 proceeds to a decision step 204, where the process 200 determines if the transmission is in a reverse gear. If the transmission is in a reverse gear, the process 200 activates in a step 206 reverse indicators, such as, for example, reverse display to a driver of the motor vehicle, reverse lights and reverse camera and then returns to the step 202. If the transmission is not in a reverse gear, the process 200 proceeds to a sub-process 208 that analyzes the clutch dynamics of the transmission 20. Depending upon the characteristics of the clutch 16, the process 200 either disables the ARM in a step 210 and returns to the step 202, or enables the ARM in a step 212 and proceeds to a sub-process 214, where enhanced in-gate downshift rev matching occurs. Note that the process 200, in particular, the clutch dynamics analysis step 208, is not limited to downshifts.

FIG. 5 illustrates greater detail of the sub-process 214. The sub-process 212 begins from a step 218 which receives information from the enable ARM step 212 of the process 200. The sub-process 214 determines in a decision step 220 whether the downshift is an in-gate or a cross-gate downshift. If the downshift is a cross-gate downshift, the sub-process moves on to a step 224, which is a return step to the step 202 of the process 200. If the decision step 220 determines that the downshift is an in-gate downshift, the sub-process adjusts in a step 222 the rev time for the downshift to occur. More specifically, in certain configurations, the rev time is increased in the step 222 for the ARM system to match the output speed of the prime mover to the input speed of the transmission. From the step 222, the sub-process 214 again proceeds to the step 224 (that is, returns to the step 202 of the process 200).

Figure 7:
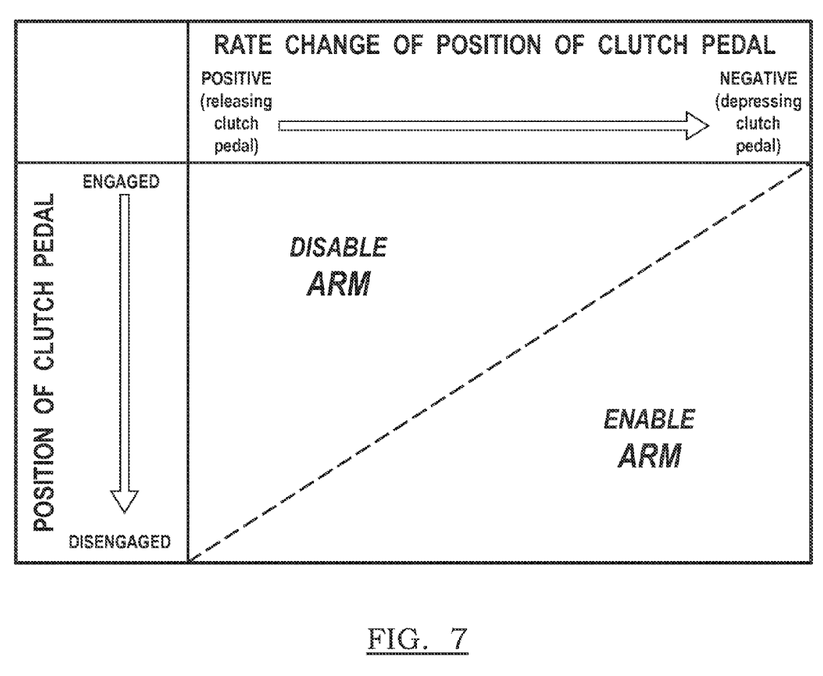
FIG. 7 depicts a look-up table for the process shown in FIG. 4.

Referring now to FIG. 6, there is shown greater detail of the clutch dynamics analysis sub-process 208 of the process 200. The sub-process 208 begins in a step 226 where it retrieves information from the decision step 204, namely, whether the transmission is in reverse. The sub-process 208 proceeds to a step 228, where the sub-process 208 determines the position of the clutch pedal with information from the clutch pedal position sensor 52. Next, in a step 230, the sub-process 208 determines the rate of change of the position of the clutch pedal position. In a step 231, the sub-process 208 compares the data from the steps 228 and 230 with a lookup table, such as, for example, the table shown in FIG. 7. The lookup table in FIG. 7 provides information related to the position of the clutch pedal and the rate of change of the position of the clutch pedal as to when to enable or disable the ARM.

With information from the lookup table, in a decision step 232, the sub-process 208 decides whether to enable the ARM or disable the ARM. If the sub-process 208 determines in the step 232 that the ARM should be enabled, the sub-process 208 proceeds to a step 234 (that is, the step 212 of the process 200 where the ARM is enabled). If the sub-process 208 determines in the step 232 that the ARM should be disabled, the sub-process 208 moves on to a step 236 (that is, the step 210 where the ARM is disabled).

The description of the invention is merely exemplary in nature and variations that do not depart from the gist of the invention are intended to be within the scope of the invention. Such variations are not to be regarded as a departure from the spirit and scope of the invention.

What is claimed is:

1. An active rev-matching (ARM) system for a motor vehicle manual transmission comprising:
    an engine control module that monitors and adjusts an output speed of the motor vehicle's prime mover; and
    at least one sensor that monitors movement of a shift linkage;
    wherein when the at least one sensor determines the movement of the shift linkage is an in-gate downshift, the engine control module adjusts a rev-match start time relative to the position of the shift linkage for the engine control module to match the output speed of the prime mover to an input speed of the transmission.

2. The system of claim 1 further comprising a sensor that monitors a position of a clutch pedal, wherein the ARM is disabled or enabled depending on the position of the clutch pedal.

3. The system of claim 2 further comprising a sensor that monitors a rate of change of the position of the clutch pedal, wherein the ARM is disabled or enabled depending on the rate of change of the position of the clutch.

4. The system of claim 3 wherein the relationship between the position of the clutch pedal and the rate of change of the position of the clutch pedal is characterized by a look-up table.

5. The system of claim 4 wherein the ARM is disabled or enabled depending on the output of the look-up table.

6. The system of claim 1 wherein the at least one sensor is at least one magnetic sensor.

7. The system of claim 6 wherein the at least one magnetic sensor is a three dimensional Hall effect sensor.

8. The system of claim 1 wherein the shift linkage further provides an "H" pattern shift gate.

9. The system of claim 8 wherein the shift gate is a six forward speed and one reverse speed shift gate.

10. The system of claim 9 wherein the in-gate downshifts are second gear to first gear, fourth gear to third gear, and sixth gear to fifth gear.

11. The system of claim 1 wherein the at least one sensor is a gear absolute position sensor (GAPS).

12. The system of claim 11 wherein the GAPS performs as at least one switch when the transmission is in a reverse gear.

13. The system of claim 12 wherein the at least one switch activates at least one of: reverse display to a driver of the motor vehicle, reverse lights and reverse camera.

14. A method of controlling an active rev-matching (ARM) system for a motor vehicle manual transmission comprising:
    monitoring and adjusting an output speed of the motor vehicle's prime mover;
    monitoring movement of a shift linkage; and
    adjusting a rev-match start time relative to the position of the shift linkage to match the output speed of the prime mover to an input speed of transmission when the movement of the shift linkage is an in-gate downshift.

15. The method of claim 14 further comprising monitoring a position of a clutch pedal and, depending on the position of the clutch pedal, disabling or enabling the ARM system.

16. The method of claim 15 further comprising monitoring a rate of change of the position of the clutch pedal and, depending on the rate of change of the position of the clutch pedal, disabling or enabling the ARM system.

17. The method of claim 16 wherein the relationship between the position of the clutch pedal and the rate of change of the position of the clutch pedal is characterized by a look-up table.

18. The method of claim 17 wherein the ARM is disabled or enabled depending on the output of the look-up table.

19. The method of claim 14 wherein the shift linkage further provides an "H" pattern shift gate.

20. The method of claim 19 wherein the shift gate is a six forward speed and one reverse speed shift gate, and wherein the in-gate downshifts are second gear to first gear, fourth gear to third gear, and sixth gear to fifth gear.

\* \* \* \* \*